US012809155B2

(12) United States Patent
Dietrich et al.

(10) Patent No.: US 12,809,155 B2
(45) Date of Patent: Nov. 24, 2026

(54) DISTANCE MEASURING DEVICE AND METHOD FOR ASCERTAINING A SPATIAL ORIENTATION OF A SAMPLE CARRIER IN MICROSCOPY

(71) Applicant: Carl Zeiss Microscopy GmbH, Jena (DE)

(72) Inventors: Christian Dietrich, Jena (DE); Jakob Haarstrich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 807 days.

(21) Appl. No.: 18/203,208

(22) Filed: May 30, 2023

(65) Prior Publication Data

US 2023/0384575 A1 Nov. 30, 2023

(30) Foreign Application Priority Data

May 31, 2022 (DE) ..................... 10 2022 205 524.1

(51) Int. Cl.
*G02B 21/26* (2006.01)
*G01S 17/08* (2006.01)

(52) U.S. Cl.
CPC .............. *G02B 21/26* (2013.01); *G01S 17/08* (2013.01)

(58) Field of Classification Search
CPC ......... G02B 21/26; G01S 17/08; G01S 17/46; G01S 17/88; G01B 11/026; G01B 11/14
See application file for complete search history.

(56) References Cited

U.S. PATENT DOCUMENTS

| | | | | |
|---|---|---|---|---|
| 4,390,277 | A | 6/1983 | Quinn | |
| 5,251,010 | A | 10/1993 | Maltby, Jr. | |
| 6,236,447 | B1 * | 5/2001 | Yamada | G03F 9/7046 355/53 |
| 9,709,390 | B2 | 7/2017 | Luxen et al. | |
| 11,300,770 | B2 | 4/2022 | Siebenmorgen et al. | |

(Continued)

FOREIGN PATENT DOCUMENTS

| | | |
|---|---|---|
| DE | 10 2012 104 282 | 11/2013 |
| DE | 10 2016 212 019 | 1/2018 |

(Continued)

*Primary Examiner* — Jennifer D Bennett
(74) *Attorney, Agent, or Firm* — Grüneberg Global IP, PLLC

(57) ABSTRACT

A distance measuring device in microscopy contains a sample stage for arranging a sample carrier in a sample plane, and at least one, preferably at least two illumination sources for providing measurement radiation, which is reflected at least proportionally at a surface of the sample carrier. The device also contains a detection optical unit for capturing an overview image and occurring reflections at the sample carrier present in the sample plane; a detector disposed downstream of the detection optical unit and serving for the spatially resolved capture of image data of the sample carrier and of occurring reflections; and an evaluation device for ascertaining at least a distance of the surface at at least one location of the sample carrier. The illumination sources emit the measurement radiation in each case at a divergent emission angle. A corresponding method can be used for ascertaining a spatial orientation of a sample carrier.

15 Claims, 8 Drawing Sheets

(56) References Cited

U.S. PATENT DOCUMENTS

| | | | | |
|---|---|---|---|---|
| 2012/0097835 | A1* | 4/2012 | Sharonov | G02B 21/0032 250/201.3 |
| 2013/0301042 | A1 | 11/2013 | Urano et al. | |
| 2018/0310829 | A1 | 11/2018 | Frangioni et al. | |
| 2019/0323829 | A1* | 10/2019 | Suenaga | G01B 11/2545 |

FOREIGN PATENT DOCUMENTS

| | | |
|---|---|---|
| JP | H01-320430 | 12/1989 |
| WO | 2013/034812 | 3/2013 |

* cited by examiner

DISTANCE MEASURING DEVICE AND METHOD FOR ASCERTAINING A SPATIAL ORIENTATION OF A SAMPLE CARRIER IN MICROSCOPY

CROSS-REFERENCE TO RELATED APPLICATIONS

This application claims priority to Germany Application No. 10 2022 205 524.1, filed on May 31, 2022, the content of which is hereby incorporated by reference in its entirety.

BACKGROUND OF THE INVENTION

Field of the Invention

The invention relates to a distance measuring device and a method for ascertaining a spatial orientation of a sample carrier.

Description of Related Art

In the field of light microscopy, samples to be imaged are held in or on transparent sample carriers during an image recording. Said sample carriers have a usually planar interface which is oriented perpendicularly or in a defined other angular position relative to the optical axis of an objective used for the image recording.

In this case, the height of different sample carriers, which can be embodied for example as microtiter plates, glass plates (coverslips), object carriers or Petri dishes, can differ significantly. Moreover, it is possible that on account of manufacturing tolerances of the sample carriers, different heights need to be taken into account even for sample carriers of an identical type. Different heights can also occur within the extent of a sample carrier and between sample carriers of a manufacturing batch, on account of manufacturing tolerances. In many cases, the bottoms of the sample carriers also have curvatures, which can be more than 100 μm.

During image capture, a respective sample carrier is mounted in a mount of a sample stage or placed onto the sample stage. Besides the different heights (thicknesses) of the sample carriers, the latter may also be used erroneously and tilted as a result. The sample carrier may also have unwanted inclinations owing to the manufacturing tolerances already mentioned.

In most methods in microscopy, it is necessary that an objective used for capturing image data must be brought close to the sample to be imaged and the transparent sample carrier. In addition, the distance between objective and sample is altered during focusing. Moreover, objective and sample are often moved relative to one another in order to image a larger region of the sample, for example.

All these relative movements involve the risk of objective and sample or sample carrier colliding with one another and damage occurring both to the sample and to the technical elements used.

The prior art discloses methods in which at least one focused beam or a collimated beam in a sharply delimited light spot is directed onto the sample carrier. A reflection caused when the beam impinges on the sample carrier is captured by means of a suitable detector and the geometry and also a surface structure of the sample carrier are deduced from the position of in particular a plurality of reflections with respect to one another. Examples of such punctiform illuminations are found in U.S. Pat. Nos. 4,390,277 A, 5,251,010 A and WO 2013/034812 A1.

The solutions described in the prior art in each case require optical elements for focusing the beams. If high-energy radiation is used, additional safety precautions have to be taken in order to prevent injury to the user or third parties.

SUMMARY OF THE INVENTION

The invention is based on the object of proposing a possibility for measuring distances between a sample carrier and optical elements of a microscope which overcomes the disadvantages known from the prior art.

The object is achieved by means of a distance measuring device and by means of a method as described below. Advantageous developments are the subject of additional described embodiments.

The invention also includes the following embodiments:

1. Distance measuring device (2) in microscopy,
   comprising a sample stage (12) for arranging a sample carrier (5) in a sample plane (PE);
   at least one, preferably at least two, illumination sources (7) for providing measurement radiation (MS) which is reflected at least proportionally at a surface of the sample carrier (5);
   a detection optical unit (4) for capturing an overview image and also occurring reflections (8.*n*) at the sample carrier (5) present in the sample plane (PE);
   a detector (4.2) disposed downstream of the detection optical unit (4) and serving for the spatially resolved capture of image data of the sample carrier (5) and of occurring reflections (8.*n*);
   an evaluation device for ascertaining at least a distance (Z) and/or a tilt of the surface at at least one location of the sample carrier (5) on the basis of the spatially resolved image data and also the knowledge of the positions of the illumination sources (7) relative to the sample plane (PE);
   characterized in that
   the illumination source (7) or the illumination sources (7) emits or emit the measurement radiation (MS) in each case at a divergent emission angle (γ).
2. Distance measuring device (2) according to embodiment 1, characterized by a number of illumination sources (7), at least one of which is arranged away from a virtual connecting line of at least two further illumination sources (7).
3. Distance measuring device (2) according to embodiment 1 or 2, characterized in that the detection optical unit (4) is oriented perpendicularly to the sample plane (PE).
4. Distance measuring device (2) according to any of the preceding embodiments, characterized in that the detection optical unit (4) is embodied in non-telecentric fashion.
5. Distance measuring device (2) according to any of the preceding embodiments, characterized in that the illumination sources (7) are arranged at an identical distance from the detection optical unit (4).
6. Distance measuring device (2) according to any of the preceding embodiments, characterized in that the illumination sources (7) are switchable in an individually controlled manner.
7. Distance measuring device (2) according to any of the preceding embodiments, characterized in that a plurality of illumination sources (7) are supplied with the measurement radiation (MS) by a common light source (6) by virtue of the fact that a beam splitter (13) is present in a beam path of the light source (6), the effect of which beam splitter is that the measurement radiation (MS) is split among a plurality of partial beam paths and the partial beam paths lead to different illumination sources (7).

8. Distance measuring device (2) according to any of embodiments 1 to 6, characterized in that a mirror (10) is arranged in the emission region of an illumination source (7), the effect of which mirror is that a portion of the emitted measurement radiation (MS) is directed onto the sample carrier (5) and a virtual illumination source (7) is formed.

9. Method for ascertaining a spatial orientation of a sample carrier (5), comprising the following steps:
   - illuminating a sample carrier (5) arranged in a sample plane (PE) with measurement radiation (MS) from at least one illumination source (7), preferably at least two illumination sources (7), the measurement radiation (MS) being emitted in the direction of the sample carrier (5) in each case at a divergent emission angle (γ);
   - capturing highlights (8.*n*) of the divergently emitted measurement radiation (MS) that occur at a surface of the sample carrier (5) in an overview recording and detecting image data in a spatially resolved manner;
   - ascertaining at least a distance (Z) and/or a tilt of the surface at at least one location of the sample carrier (5) on the basis of the two-dimensional image data and also the knowledge of the positions of the illumination sources (7) relative to the detection optical unit (4).

10. Method according to embodiment 8, characterized in that a distance (Z) is ascertained at least at two locations of the sample carrier (5) and a surface shape and/or an orientation of the sample carrier (5) are/is ascertained from the values obtained in the process.

11. The method according to embodiment 8 or 9, characterized in that the sample carrier (5) is illuminated with measurement radiation (MS) from at least three illumination sources (7) which form corner points of a virtual triangle, and a distance (Z) of the sample carrier (5) is ascertained from an ascertained spacing of the positions of the captured highlights (8.*n*) of the illumination sources (7) and a tilt of the sample carrier (5) relative to the sample plane (PE) is ascertained on the basis of a spacing of the positions of the captured highlights (8.*n*) with respect to a predetermined reference point.

12. Method according to any of embodiments 9 to 11, characterized in that a distance (Z) of the sample carrier (5) and a tilt of the sample carrier (5) relative to the sample plane (PE) are ascertained at a plurality of locations and a map of the sample carrier (5) is created.

13. Method according to any of embodiments 9 to 12, characterized in that in the case where a tilt is present, the position of the sample carrier (5) is changed in order to compensate for the tilt.

DETAILED DESCRIPTION OF THE INVENTION

Figure 1:
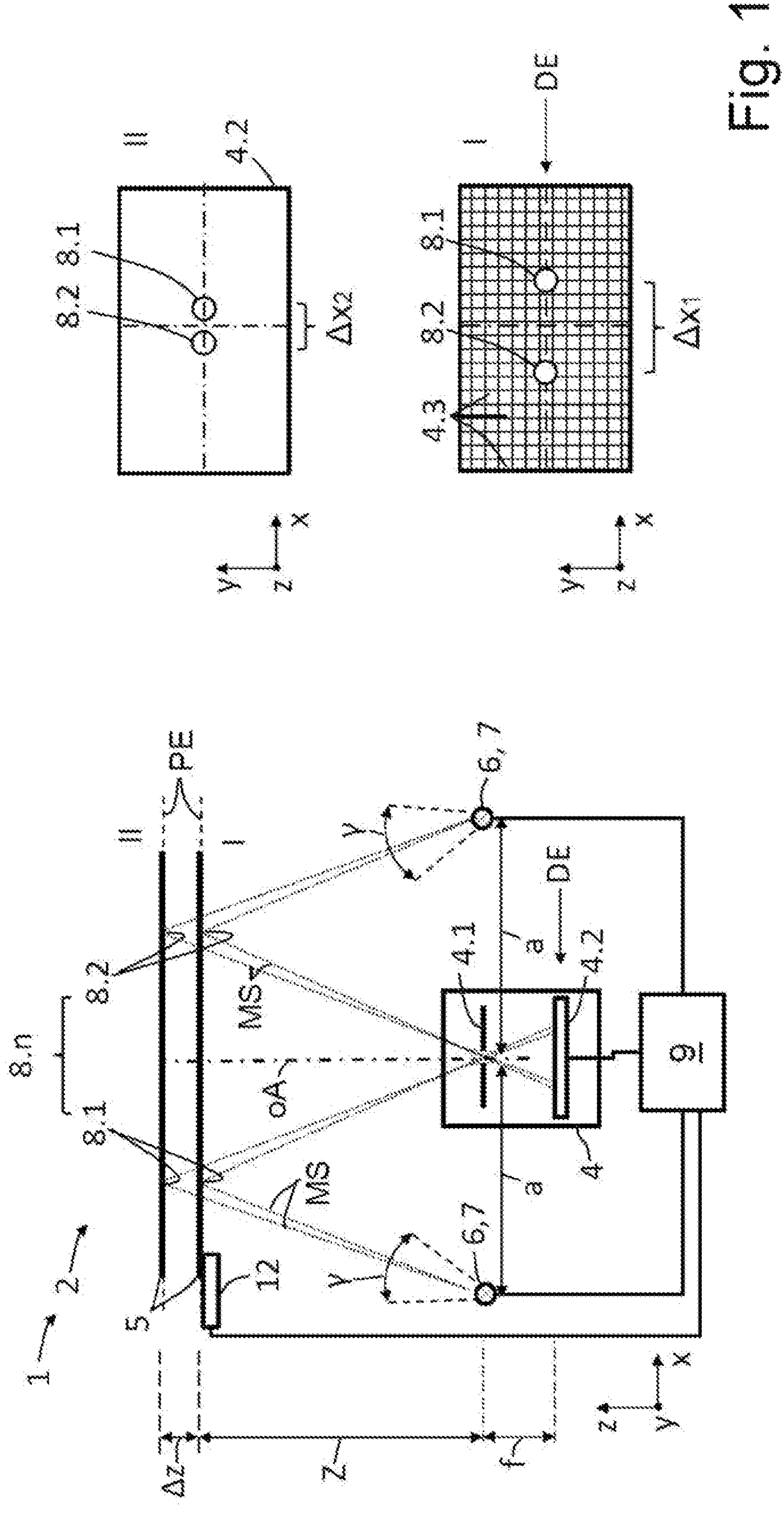
FIG. 1 shows a schematic illustration of a first exemplary embodiment of a distance measuring device according to the invention and of the ascertainment of axial distances between sample carrier and illumination sources and also a detector.

The distance measuring device serves for use in the field of microscopy and comprises a sample stage for arranging a sample carrier in a sample plane. Furthermore, there is at least one, but preferably at least two illumination sources for providing measurement radiation which is reflected or can be reflected at least proportionally at a surface of the sample carrier. In this case, the surface acts as an optical interface. A detection optical unit likewise present can capture both an overview image and occurring reflections at the sample carrier situated in the sample plane. A detector suitable for the spatially resolved capture of image data of the sample carrier and of occurring reflections is disposed downstream of the detection optical unit in a detection beam path. Such a detector comprises a multiplicity of detector elements in a detection plane, which detector elements can preferably be read individually. Examples of such detectors are CCD, CMOS and sCMOS detectors and also arrangements of a number of individual detectors such as, for example, PMT or SPAD arrays. The detection optical unit, which hereinafter is also referred to as an overview camera for simplification, is not necessarily identical with an objective of the microscope that serves for the actual microscopic image capture. Overview camera and objective of the microscope can be present. An evaluation device likewise present is configured for ascertaining at least a distance and/or a tilt (tilt position) of the surface at at least one location of the sample carrier on the basis of the spatially resolved image data and also the knowledge of the positions of the illumination sources relative to the detection optical unit. The evaluation device is for example a computer (e.g. PC, FPGA) or a compartment of a computer configured therefor. The evaluation device can be embodied as a constituent part, for example as a subunit or compartment, of a controller.

According to the invention, the distance measuring device is characterized in that the illumination sources emit the measurement radiation in each case at a divergent angle.

The angular range at which the measurement radiation is emitted is at least 15°, for example. In further embodiments of the distance measuring device, the angular range can be at least 35°, for example 45°, 60°, or including 90°.

In contrast to the teaching of the prior art, it has been recognized that reflections from divergently emitting illumination sources can also be used for ascertaining a distance of the sample carrier and optionally also for ascertaining the spatial orientation thereof, in particular with regard to tilts, with a high precision. What is advantageous here is that with the use of divergently emitting illumination sources, there is no need for optical elements for focusing. Moreover, inexpensive light sources with low (beam) quality can be used. Safety measures such as are required for high-energy radiation, for example laser light, can advantageously be dispensed with. The light sources can additionally be used as illumination elements, while the sample is imaged by means of the objective of the microscope, for example.

The invention exploits the circumstance that a small proportion of measurement radiation, for example visible light, is reflected even at transparent surfaces (so-called highlights). The central concept of the invention is to use a suitable detector to capture such highlights from illumination sources attached to the stand of a microscope in a defined manner. The evaluation of the position of these highlights in the captured image allows the position of the sample carrier to be determined.

By way of example, a lower surface, i.e. the downwardly directed side surface or the bottom, of a sample carrier can be illuminated with the measurement radiation and the distance of said sample carrier and optionally the tilt position (tilt) thereof can be ascertained.

Hereinafter, an illumination source is understood to mean any technical element and any physical effect by means of which measurement radiation reaches the sample plane and a sample optionally situated there in a predetermined manner. In this case, an illumination source can itself be a light source, for example an LED, an OLED, or a lamp, for example a halogen lamp. Illumination source is also understood to mean an image representation of a light source. In this regard, for example, the measurement radiation originating from a light source can be partly or wholly forwarded by means of mirrors and radiated in the direction of the sample plane (virtual illumination source, see below). Each illumination source is advantageously small enough that it can be captured by just a few detector elements (pixels) of the overview camera.

The arrangements of the illumination sources in relation to their spatial position relative to an overview camera, for example, are known and remain positionally fixed in a simple embodiment of the invention. In further embodiments, the illumination sources can be positionally variable, whereby a higher flexibility of the device is attained. The positions of the illumination sources are known, however, in any case. As a result, it is possible to ascertain the position of the illuminated interface and the orientation thereof with regard to its horizontal position, for example, with sufficient accuracy. Afterward, it is possible to correct the orientation and/or the axial position of the sample carrier in a direction perpendicular to the sample plane.

A relationship between a coordinate system of the detection optical unit and a microscope, in particular an objective of the microscope, can be established by way of a calibration. By means of a measurement of the sample carrier placed onto the sample stage, the orientation of said carrier's interface facing the illumination sources can be ascertained, thereby enabling the sample or the sample carrier to be approached safely without collisions.

The detection optical unit images the image of the illumination source reflected at the sample carrier onto the detector. In this case, it is not necessary for the reflection to be situated at the focus of the detection optical unit. The size of the illumination source is chosen to be small enough so that, in cooperation with the detection optical unit, a light distribution on the detector is brought about which can in each case be assigned a unique position on the detector.

In contrast to light spots of focused light in the prior art, image representations of highlights have a large area since the specularly reflected images of the light source are usually not situated at the focus of the detection optical unit. In order to determine their position on the detector, an intensity maximum can be localized in a simple case. It is also possible to define the centroid of the light distribution caused by the light source on the detector.

It may be advantageous to perform a computation of two or more images which involves the illumination source being switched on and off. The image recording with the illumination source switched off can thus be used as a background signal, which can be subtracted from the actual signal image with the illumination source switched on.

Highlights which arise on account of multiple reflections at sample or holder structures deviate from expected manifestations of highlights in terms of their shape and size and can thus be recognized and excluded. This also applies to interfaces which are optically roughened as a result of contaminants or do not satisfy the condition of a planar interface as a result of a high degree of curvature. In order to recognize such deviations, properties of expected highlights, such as shape and size, can be ascertained and stored in a retrievable manner. Expected properties can be ascertained for example by means of a reference sample (also see below) or a simulation.

Furthermore, such highlights which are influenced by a plurality of different interfaces can be used. For example, in the case of depressions filled with a liquid (Petri dish; multiwell plate, microtiter plate), a distinctive secondary reflection appears which indicates the presence and filling level of the liquid.

In order to ascertain the distance between the sample carrier and the detection optical unit or some other previously determined reference point, one illumination source is sufficient in principle. However, with only one highlight, it is not possible to establish deviations of the sample carrier from a predetermined orientation (tilt), in particular a horizontal position. A tilt and the distance of the sample carrier can already be ascertained with the captured highlights of two illumination sources. In this case, it is necessary to know the position of the illumination sources relative to the optical axis of the detection optical unit, e.g. by means of a calibration carried out with the measurement of the positions of highlights at a reference sample that is positioned and oriented in a defined manner. An optical mirror can advantageously be used as reference sample.

In order to be able to ascertain tilts in two spatial directions or independently of the position of the highlights relative to the direction of the tilt, in a further advantageous embodiment of the distance measuring device, at least three illumination sources can be present, at least one of which is arranged away from a virtual connecting line (straight line) of at least two further illumination sources. The reflections (highlights) brought about on account of the at least three illumination sources therefore form the corner points of a triangle on the illuminated interface of the sample carrier. If more illumination sources are present or used, the reflections form corresponding polygons or patterns.

In order to ascertain tilts and distances of the sample carrier in a computationally simple manner, it is advantageous if the illumination sources are arranged at an identical distance from the detection optical unit.

As described above, the invention makes it possible to use highlights for a determination of distances between the sample carrier and, by way of example, a detection optical unit, for example an overview camera. It is advantageous here if the detection optical unit is oriented perpendicularly to the sample plane and is embodied in non-telecentric fashion. In this case, a distance between the captured reflections and a freely chosen reference point, for example the midpoint of the detection plane of the detector, is dependent on the distance between the sample carrier and the detection optical unit. Therefore, the relations of the distances can be used to ascertain the distance of the sample carrier.

A further advantage of the distance measuring device according to the invention can be obtained if the illumination sources are switchable in an individually controlled manner. In such an embodiment of the device according to the invention, the highlights can be captured and evaluated individually and in a manner uniquely assigned to the respective illumination sources.

The electrically switchable light sources, which can also function directly as illumination sources, are advantageously embodied as LEDs (light emitting diodes). LEDs are inexpensive optical components having a large emission angle range.

Furthermore, it is advantageous if the working distance of the distance measuring device lies in the range of the parfocal length of a traditional objective of a microscope. In this case, no or only little lateral and/or axial repositioning of the sample carrier is necessary when the objective is changed.

In order to save optical components in further embodiments of the device, a plurality of illumination sources can be supplied with the measurement radiation by a common light source. This can be realized by virtue of the fact that a beam splitter is present in a beam path of the light source, the effect of which beam splitter is that the measurement radiation is split among a plurality of partial beam paths and the partial beam paths lead to different illumination sources. Splitting can be effected by means of a 50/50 beam splitter, for example. Such an embodiment optionally makes it possible to generate one of the highlights along an optical axis in particular of the beam splitter onto the sample carrier. This highlight brought about on account of the measurement radiation projected perpendicularly into the sample plane and also a second highlight brought about away from the optical axis can be used for distance measurement and/or for ascertaining a tilt position of the sample carrier.

In a further embodiment of the invention, a mirror is arranged in the emission region of the illumination source, the effect of which mirror is that a portion of the emitted measurement radiation is directed onto a different location of the sample carrier than the remaining portion. In this way, the mirror acts as a virtual illumination source.

The object of the invention is additionally achieved by a method for ascertaining a spatial orientation of a sample carrier. In the simplest case, the orientation of the sample carrier is given by its distance for example from a detection optical unit or relative to some other known reference point of a device used, for example of a distance measuring device according to the invention. The method comprises the following steps. One step involves illuminating a sample carrier arranged in a sample plane with measurement radiation from at least one illumination source, preferably at least two illumination sources. The measurement radiation here is emitted in the direction of the sample carrier in each case at a divergent angle.

The reflections of the divergently emitted measurement radiation that occur at a surface (interface) of the sample carrier are captured in an overview recording and detected as image data in a spatially resolved manner. At least a distance of the surface at at least one location of the sample carrier is ascertained on the basis of the two-dimensional image data and also the knowledge of the positions of the illumination sources relative to the detection optical unit.

It is also possible, albeit more complex, to ascertain the distance of the sample carrier at a multiplicity of locations. For this purpose, the sample carrier can be displaced relative to the illumination sources and the detection optical unit for the individual measurements. The values respectively ascertained are stored in a manner assigned to the respective locations. In this way, a map of the distances (e.g. as z-values) is obtained, from which a topography of the illuminated interface of the sample carrier and also the orientation thereof can be derived. In order not to measure the entire sample carrier in a close-meshed manner, individual regions can be measured and used as interpolation points for example for a model used to simulate the topography of the sample carrier.

In order, in a further configuration of the method according to the invention, to ascertain a surface shape and/or an orientation of the sample carrier, a distance is ascertained at at least two different locations of the sample carrier. From the values obtained in the process, it is possible to ascertain an orientation in at least one direction in which the two locations lie. In this case, an orientation is understood to mean a position relative to a first direction in the sample plane. An orientation can thus be a tilt or a parallel positioning relative to the sample plane. Here, too, it is possible to create a map of the sample carrier that incorporates tilts for a plurality of locations.

Of course, it is also possible to produce maps that present both distances and tilts in a location-related manner.

In order to be able to ascertain the orientation of the sample carrier in two mutually perpendicular directions of the sample plane, the sample carrier can be illuminated with measurement radiation from at least three illumination sources. At least one of the at least three illumination sources is arranged away from a virtual connecting line (straight line) of at least two of the illumination sources. The illumination sources form the corner points of a virtual triangle, for example.

A distance of the sample carrier can be ascertained from the spacing of the positions of the captured highlights of the illumination sources with respect to one another if a non-telecentric observation optical unit is used. A tilt of the sample carrier relative to the sample plane can be ascertained on the basis of a spacing of the positions of the captured highlights with respect to a determined reference point.

Both the actual values of an ascertained distance and a tilt of the sample carrier can be evaluated and compared with corresponding target values in order to be able to compensate for possible deviations. If the actual values deviate from predetermined target values to a greater extent than is permissible, corresponding control commands can be generated in order to control for example an adjustable sample stage on which the sample carrier is held. Alternatively, the position of the sample carrier can be corrected manually.

The advantages of the distance measuring device according to the invention and of the method according to the invention reside in particular in the possibility of being able to ascertain the axial position (distance relative to the detection direction, z-direction) and possible tilts of a sample carrier with little technical complexity. The information thus obtained pertaining to the orientation of the sample carrier allows relative movements for example of the sample carrier and of an optical unit present for capturing microscopic image representations, without these colliding with one another. The information acquired in particular with regard to occurring tilts can additionally be used for leveling the sample carrier, in particular for the orientation thereof parallel to the sample plane. The invention can easily be implemented in existing devices and is easily able to be applied by a user.

Further advantages of the invention are afforded by the fact that the orientation of the sample carrier is ascertained by means of an overview camera and therefore independently of an objective used for the actual imaging according to the respective microscopic method. The detection optical unit has a high working distance with respect to the sample plane and has a large measurement range in the centimeters range Therefore, there is no risk of collision between sample carrier and detection optical unit. The invention is suitable for all sample formats which have a substantially planar, partly reflective surface, as is the case for example for glass carriers, Petri dishes, multiwell plates or microtiter plates. If the configuration of a mapping of the interface of the sample carrier is chosen, sample formats having deviations from a planar form can also be used. The invention allows the use of inexpensive and easily controllable illumination sources for which, moreover, increased safety precautions need not be taken.

Possible applications of the invention reside for example in rapid measurement of a first collision plane and, in association therewith, collision avoidance at a motorized microscope between microscope objective (objective) and sample carrier. The knowledge of an axial distance and of possible tilts of the sample carrier additionally assists the focusing of a sample to be imaged, since the axial distance of the sample carrier offers a very highly suitable start value of focusing, in particular of automated focusing. Moreover, the sample carrier can be oriented sufficiently orthogonally with respect to the optical axis of the microscope objective at every location. Besides recognizing the orientation and possible local special characteristics of the sample carrier, for example curvatures and also optically roughened regions, the acquired measurement data of the sample carrier can be used for correct navigation on the basis of an overview image of the sample carrier or of the sample.

Figure 2:
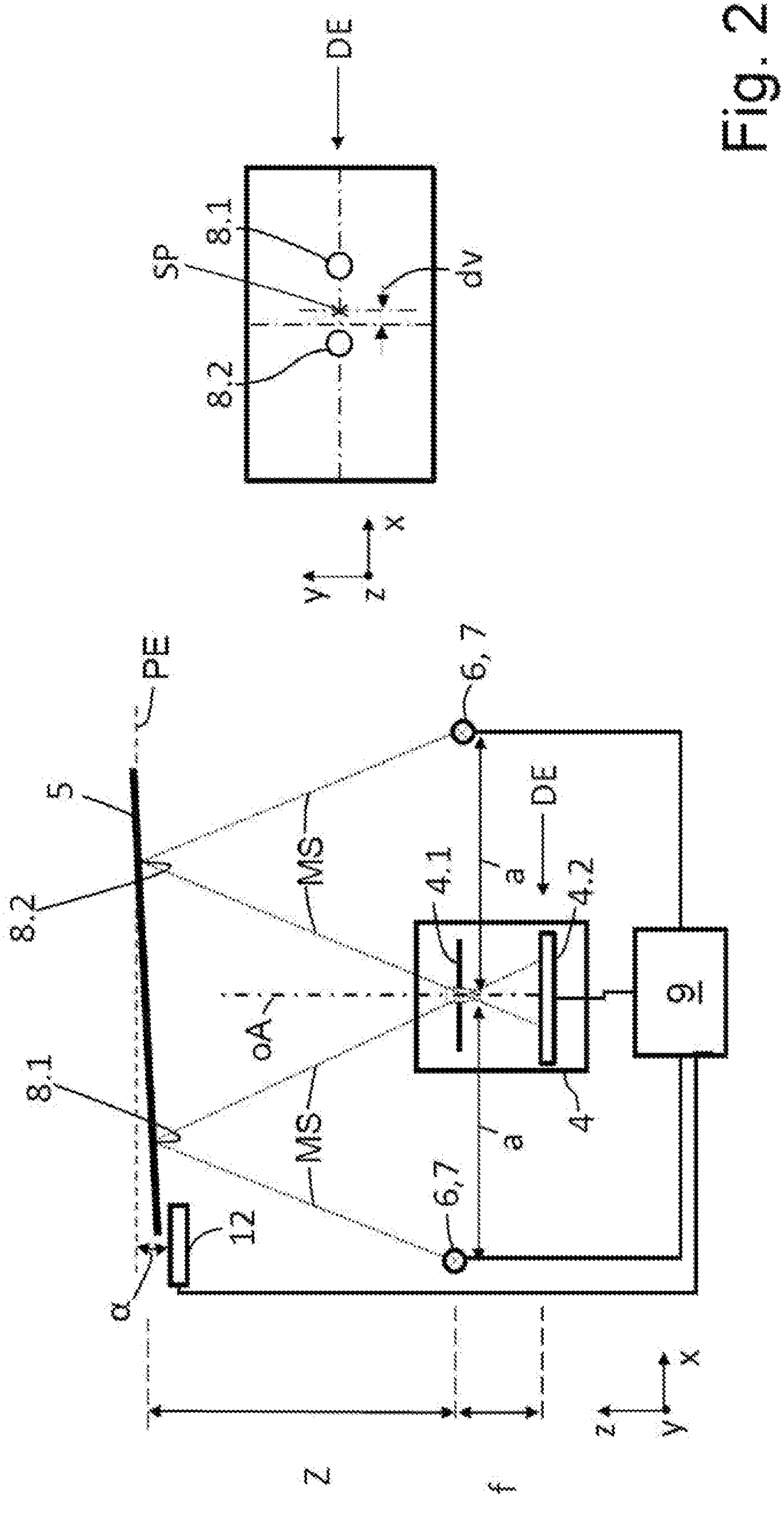
FIG. 2 shows a schematic illustration of the first exemplary embodiment of a distance measuring device according to the invention and of the ascertainment of a lateral tilt of the sample carrier relative to the illumination sources and the detector.
Figure 3:
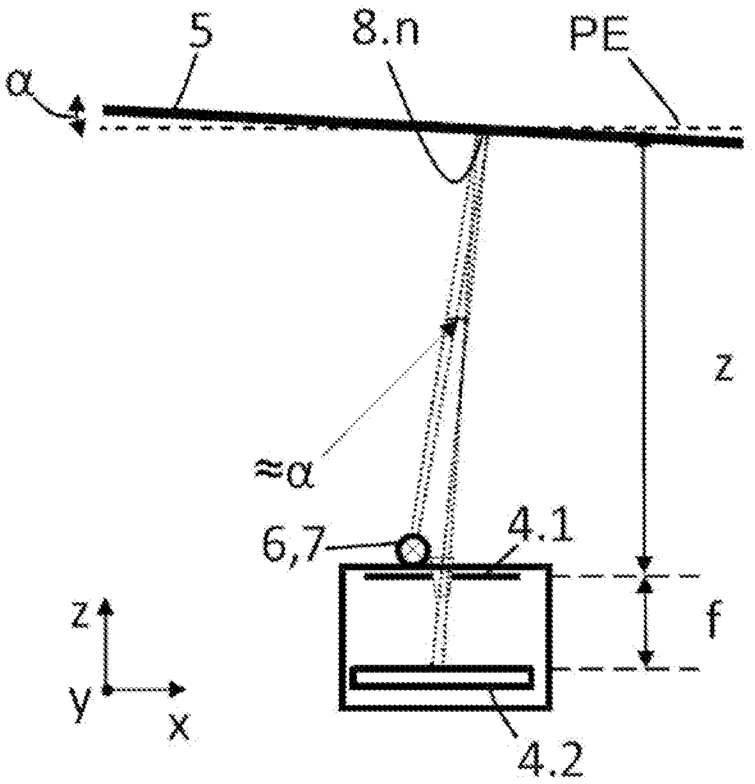
FIG. 3 shows a schematic illustration of the effect of a tilted sample carrier on the position of an imaged paraxial reflection in a detector plane.
Figure 4:
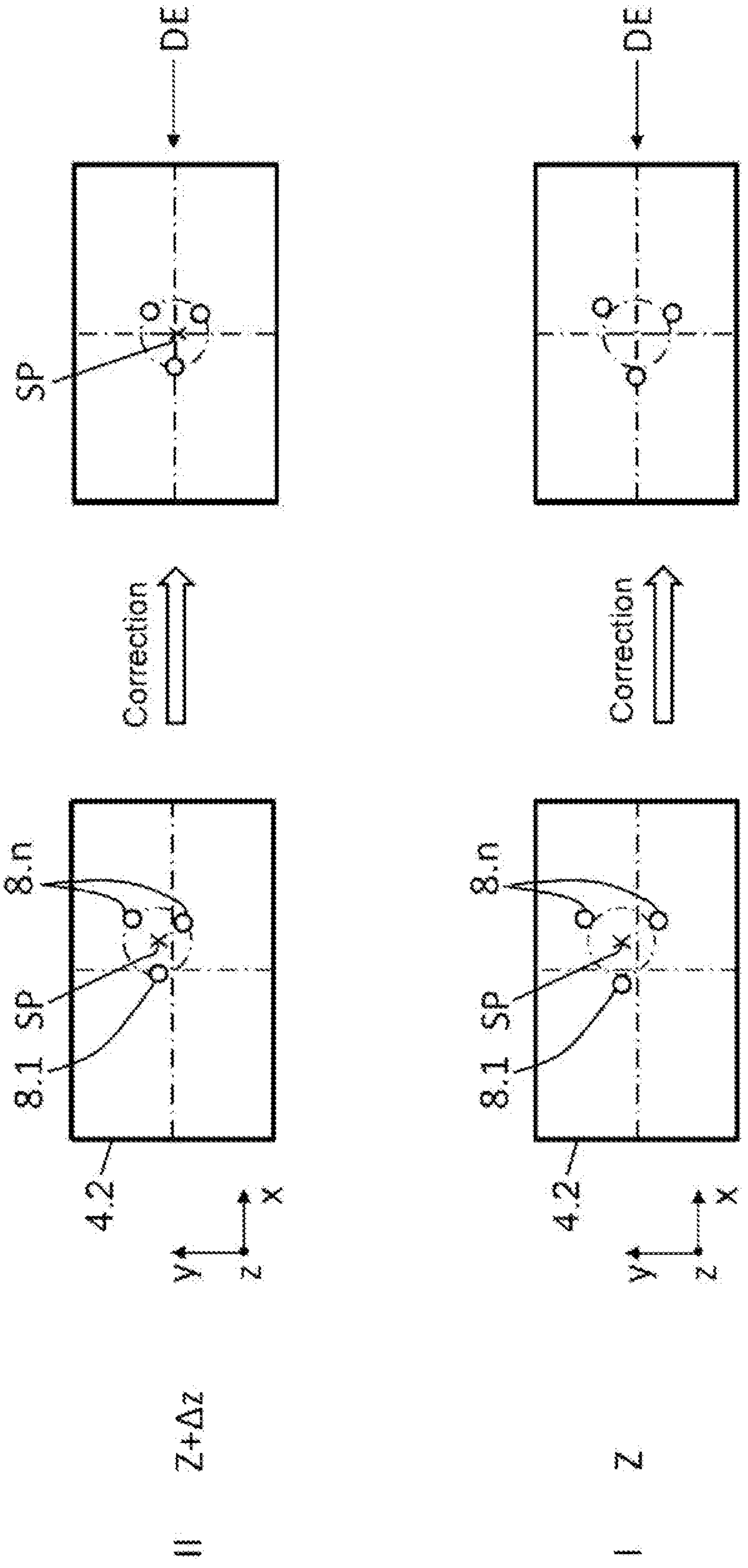
FIG. 4 shows a schematic illustration of a configuration of the method according to the invention, which involves ascertaining lateral tilts of the sample carrier in two spatial directions relative to the illumination sources and the detector by means of a plurality of illumination sources and highlights.
Figure 5:
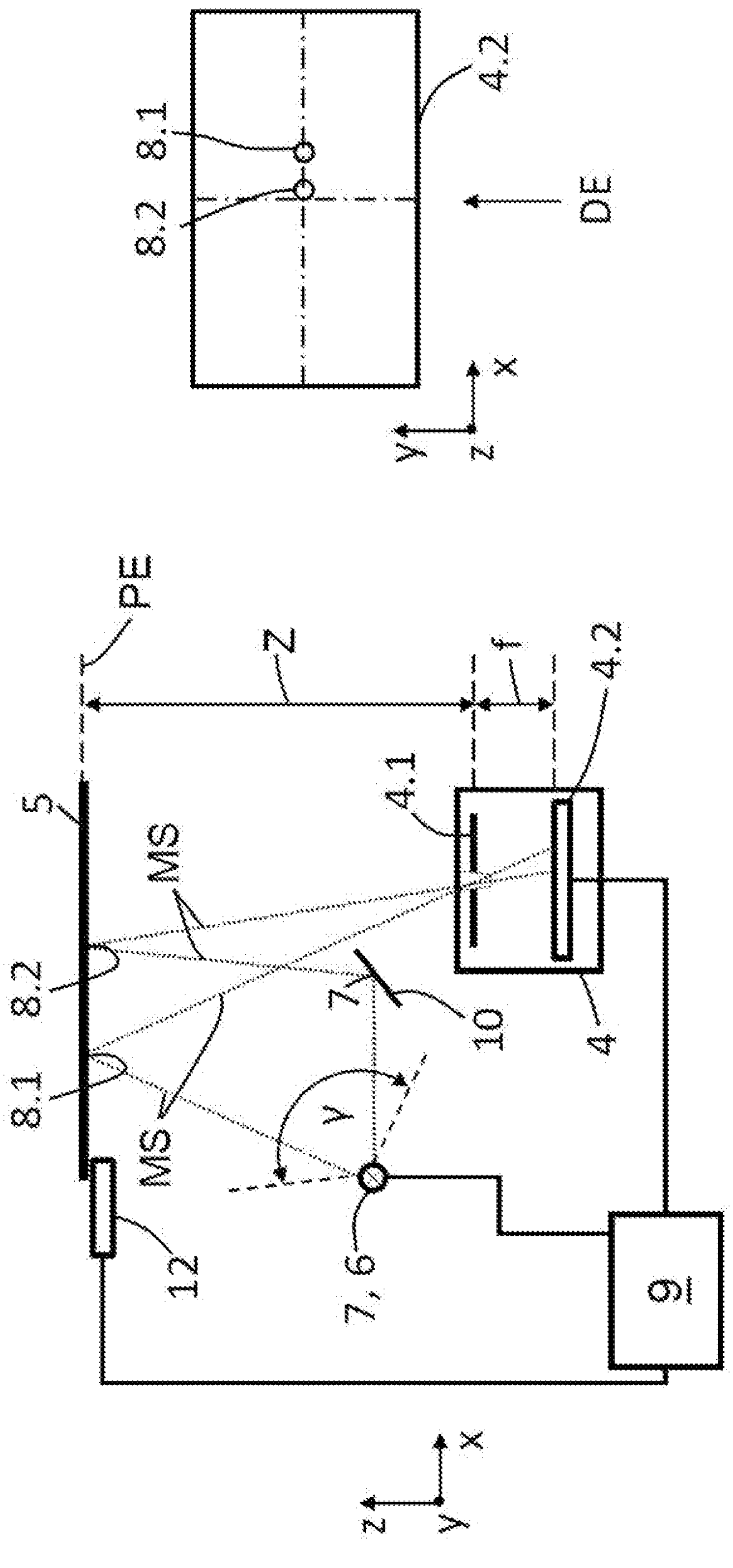
FIG. 5 shows a schematic illustration of a second exemplary embodiment of the distance measuring device according to the invention, in which two illumination sources are fed by one light source.
Figure 6:
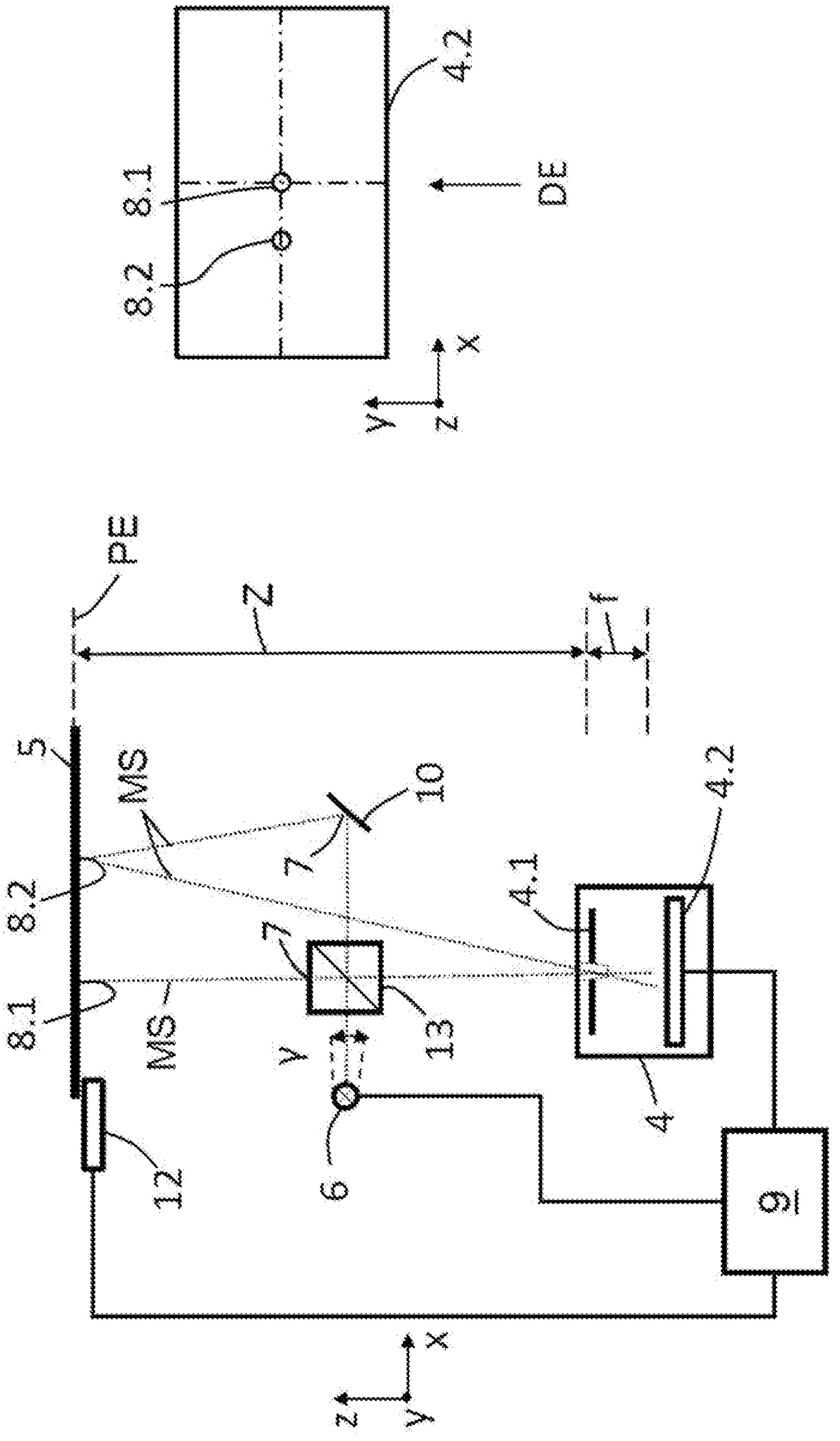
FIG. 6 shows a schematic illustration of a third exemplary embodiment of the distance measuring device according to the invention, in which two illumination sources are fed by one light source.
Figure 7:
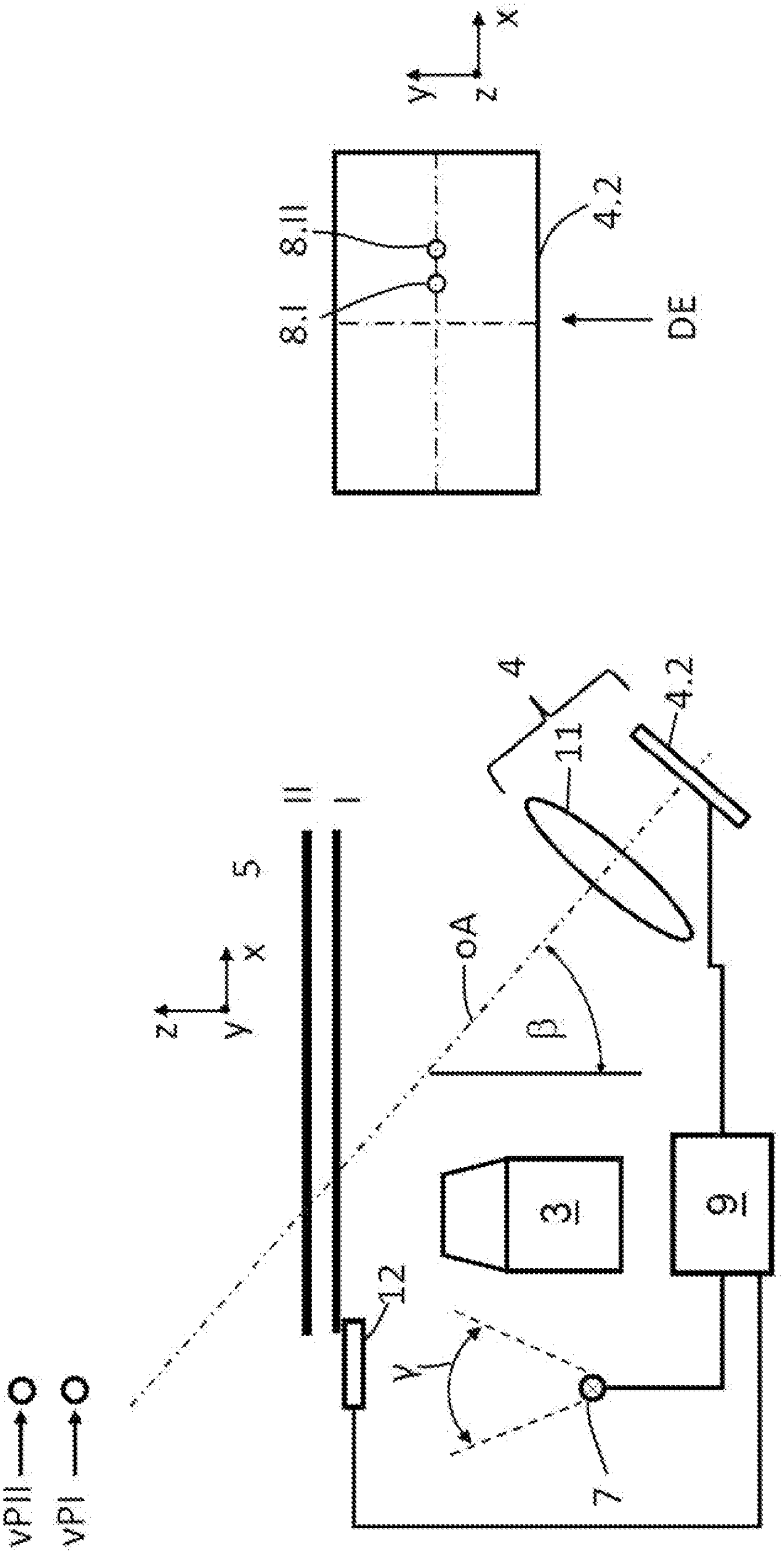
FIG. 7 shows a schematic illustration of a fourth exemplary embodiment of the distance measuring device according to the invention, in which the detector is part of a telecentric detection optical unit.
Figure 8:
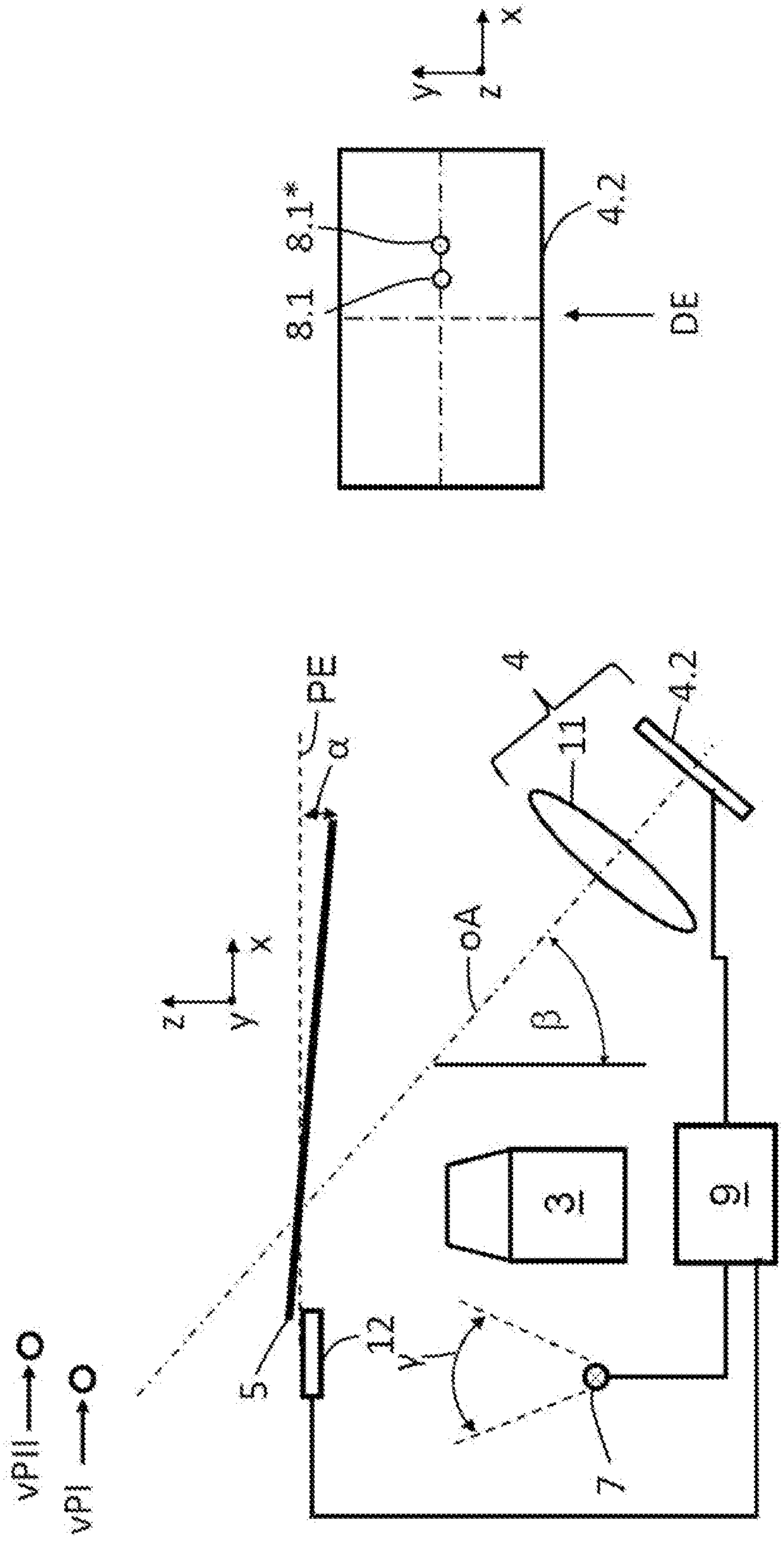
FIG. 8 shows a schematic illustration of the effect of a tilt of the sample carrier on the position of an imaged reflection in a detector plane in the distance measuring device according to the invention in accordance with the third exemplary embodiment.

The invention is explained in more detail below on the basis of exemplary embodiments and illustrations. In the figures:

FIG. 1 shows a schematic illustration of a first exemplary embodiment of a distance measuring device according to the invention and of the ascertainment of axial distances between sample carrier and illumination sources and also a detector;

FIG. 2 shows a schematic illustration of the first exemplary embodiment of a distance measuring device according to the invention and of the ascertainment of a lateral tilt of the sample carrier relative to the illumination sources and the detector;

FIG. 3 shows a schematic illustration of the effect of a tilted sample carrier on the position of an imaged paraxial reflection in a detector plane;

FIG. 4 shows a schematic illustration of a configuration of the method according to the invention, which involves ascertaining lateral tilts of the sample carrier in two spatial directions relative to the illumination sources and the detector by means of a plurality of illumination sources and highlights;

FIG. 5 shows a schematic illustration of a second exemplary embodiment of the distance measuring device according to the invention, in which two illumination sources are fed by one light source;

FIG. 6 shows a schematic illustration of a third exemplary embodiment of the distance measuring device according to the invention, in which two illumination sources are fed by one light source;

FIG. 7 shows a schematic illustration of a fourth exemplary embodiment of the distance measuring device according to the invention, in which the detector is part of a telecentric detection optical unit; and FIG. 8 shows a schematic illustration of the effect of a tilt of the sample carrier on the position of an imaged reflection in a detector plane in the distance measuring device according to the invention in accordance with the third exemplary embodiment.

In the following exemplary embodiments, identical technical elements are provided with the same reference signs.

A distance measuring device 2 according to the invention is in particular a constituent part of a microscope 1 (merely intimated in the drawing) and comprises as essential elements a detection optical unit 4 in the form of an overview camera and also two divergently emitting illumination sources 7 formed by separate and individually controllable light sources 6 in the form of LEDs in the exemplary embodiment shown (FIG. 1).

Measurement radiation MS emitted by the illumination sources 7 at an emission angle $\gamma$ of 30°, for example, illuminates a sample carrier 5 arranged on a sample stage 12 in a sample plane PE, said sample carrier being formed for example by a coverslip, the bottom of a Petri dish or of a multiwell plate. The illumination sources 7 are arranged in a manner spaced for example approximately 70 mm from the sample plane PE and illuminate a region of approximately 20 mm in diameter. In this case, the highlights 8.1, 8.2 generated do not overlap and can be recognized as respectively separate highlights 8.1, 8.2.

FIG. 1 shows the sample carrier 5 in two operating positions I and II, which are indicated in each case along the optical axis oA of the detection optical unit 4. The first operating position I is at a first distance Z from the detection optical unit 4. The second operating position II is further away from the detection optical unit 4 by a distance $\Delta z$. The detection optical unit 4 is non-telecentric in the exemplary embodiments concerning FIGS. 1 to 6.

It shall first be assumed that the sample carrier 5 is situated in the first operating position I. The measurement radiations MS of each of the illumination sources 7 reach the side surface of the sample carrier 5 facing the illumination sources 7 and are each reflected at least proportionally there, such that a reflection or highlight 8 occurs in each of the regions of impingement of the measurement radiations MS and becomes visible on the detector. A first highlight 8.1 and a second highlight 8.2 are indicated for elucidation purposes.

The images of the two highlights 8.1, 8.2 are captured by means of the detection optical unit 4, which are guided through a stop 4.1 (pinhole camera) shown by way of example onto a detection plane DE of a spatially resolving detector 4.2. The images of the highlights 8.1 and 8.2 are detected by means of the detector 4.2, as is illustrated for the first operating position I in the plan view of the detection plane DE inserted on the right. A number of detector elements 4.3 of the detector 4.2 are illustrated in a simplified manner in this illustration. It can be discerned here that an image of a highlight 8.*n* is captured in each case by a plurality of detector elements 4.3.

A horizontal and a vertical auxiliary center line are additionally shown for orientation purposes. Only the auxiliary center lines are shown in the further depictions of the detector plane DE (FIGS. 1, 2, 5 to 8), for the sake of better clarity.

The illumination sources 7 are advantageously small enough so that the respective highlights 8 in cooperation with the detection optical unit 4 can be imaged on the detector 4.2 in such a way that their images (also designated by 8.*n*, where n=1, 2, . . . , n, for the sake of simplicity) can be uniquely identified and assigned to the respective illumination sources 7. In this case, it is advantageous, but not necessary, for the highlights 8.*n* to arise at the focus of the detection optical unit 4. It is necessary, however, for the image representations of the illumination sources (highlights) to be able to be determined as individual structures in terms of their position on the detector.

On the basis of the example of the exemplary embodiment in FIG. 1, it can be shown that the images of the highlights 8.*n* approach one another if the distance between the sample carrier 5 and the detection optical unit 4 increases. If the sample carrier 5 is situated at a distance Z in the first operating position I, then the images of the highlights 8.1 and 8.2 are at a distance Δx1 from one another.

By contrast, if the sample carrier 5 is situated at a distance Z+Δz in the second operating position II, then the distance Δx2 between the images is less than the distance Δx1.

The respective distances Δxn are ascertained by carrying out a position determination of the respective highlights 8.1, 8.2 in the detector plane DE. This can be done by ascertaining an intensity maximum and/or a centroid SP (in this respect, see FIGS. 2 and 5) and also the position thereof for the respective images of the highlights 8.*n*.

A relationship between the ascertained distances Δxn and the associated distances Z and Z+Δz, respectively, can be ascertained experimentally or computationally in the form of a calculation specification, i.e. a mathematical function, and/or in the form of tables (e.g. look-up table) and can be kept available for a use.

The distance measuring device 2 optionally comprises a controller 9 configured for generating control commands. Moreover, compartments of the controller 9 are configured to store and evaluate image data captured by means of the detector 4.2. By way of example, the controller 9 can be designed and configured to carry out a position determination of the images of the highlights 8.*n*. The controller 9 can additionally be connected to the sample stage 12 and control the latter as necessary.

The controller 9 can additionally be designed to recognize, on the basis of predefined parameters, such images of highlights 8.*n* which arose completely or partly on account of multiple reflections at sample or holder structures. By way of example, for this purpose, the shape and size of expected highlights can be compared with those of the actually captured images of the highlights 8.*n*.

A simple estimation of the above-described change in the distances Δxn in relation to a change in the distance Δz by one millimeter is given below by way of example. For this purpose, it is assumed that the detection optical unit 4 has a focal length of three millimeters, and a distance a between the illumination sources 7 and the optical axis oA is ten millimeters. The distance Z (working distance) is assumed to be 65 mm.

Under the simplifying assumption of a configuration of the detection optical unit 4 as a pinhole camera, a distance Δx1 between the images of the two highlight points 8.1, 8.2 of around 461.5 μm results in the case of image capture in the first operating position I. In the second operating position II (65 mm+1 mm=66 mm), the distance Δx2 is around 454.5 μm. That is a change in the distance Δxn by around 1.5%. In order to attain a measurement accuracy of 100 μm sought by way of example for the distance Z and Z+Δz, respectively, the distances Δxn would have to be measured with an accuracy of 0.1%. This demanding requirement is achievable by means of the invention since only a low resolution between the highlight points 8.*n* is required for a high localization accuracy of the images of the highlights 8.*n*. A high signal strength of the highlights 8.*n* is advantageous here in order to determine their positions with sub-pixel accuracy. The positions can thus be determined with an accuracy that even lies within the spatial extent of the detector elements 4.3 (=pixels).

By means of a distance measuring device 2 in accordance with the first exemplary embodiment, lateral tilts of the sample carrier 5 can also be ascertained besides a distance Z (FIG. 2). In the simplest case, a tilt of the sample carrier 5 by a tilt angle α relative to the sample plane PE—and thus also relative to the detection optical unit 4 and the illumination sources 7—can be ascertained with only two illumination sources 7. For this purpose, the positions of the two illumination sources 7 relative to the detection optical unit 4 must be known, either from a measurement (calibration) or by way of a correspondingly accurate positioning of the illumination sources 7 during manufacture.

In the example in FIG. 2, the separate illustration of the detector plane DE shows a lateral offset dv of a virtual centroid SP of the two images of the highlights 8.1 and 8.2 relative to the midpoint of the detector plane DE, this being brought about by the tilt, effected here along the arrangement relative to the optical axis oA of both illumination sources 7.

A compensation of the ascertained tilt can be brought about for example by means of the controller 9 generating control commands and communicating them to a sample stage 12 that is adjustable by motor. The actuating movements of the sample stage 12 that are produced on account of the execution of the control commands can compensate for the unwanted tilt.

The sensitivity of a paraxially arranged light source 6 or illumination source 7 in regard to an occurring tilt is illustrated in FIG. 3. As an approximation of a light source 6 and respectively an illumination source 7 positioned very close to the detection optical unit 4, and on the condition that the working distance Z is significantly greater than the focal length f, a tilt angle α (alpha) results in an altered reflection angle of ≈α (alpha). An advantage of a paraxial arrangement of the light source 6 or illumination source 7 is that the position of the imaged highlight point 8.*n* is independent of the distance of the interface of the sample substrate. By way of example, a tilt of five arc minutes given a focal length of f=3 mm results in a lateral offset of the image of the highlight point 8.*n* by approximately 4 μm, which is of the order of magnitude of a detector element 4.3 (see FIG. 1; =pixel size) of a commercially available detector 4.2 and is thus readily detectable. In the case of an illumination source reflected directly into the optical axis of the detection optical unit (oA), one illumination source is thus sufficient for very sensitively detecting a tilt and accurately correcting it.

A combination of distance measurement and ascertainment of an occurring tilt is explained with reference to FIG. 4. By means of a distance measuring device 2, not illustrated in more specific detail, with the use of three illumination sources 7 arranged symmetrically around the optical axis oA, three highlights 8.1, 8.2 and 8.3 are brought about on a sample carrier 7 and are imaged into the detector plane DE by means of the detection optical unit 4.

The upper row shows an image representation of highlights 8.1 to 8.*n* in a second operating position II with a distance Z+Δz and a tilt position. The distance Z+Δz can be derived from the distances of the imaged highlights 8.1 to 8.*n*, as explained above. A circle with a dash-dotted line is shown in each case as a visual aid. The tilt results in a position of the centroid SP outside the center of the detector plane DE. In this case, it should be pointed out that the center of the detector plane DE is used as a reference point here merely in order to afford a better understanding. The centroid SP is given by the geometric centroid of the imaged highlights 8.1 to 8.*n*, to put it more precisely by the geometric centroid of their previously ascertained positions (see above). The distance and direction of the deviation of the centroid SP from the reference point that would be occupied by the centroid SP in the case of a position without tilting allow the derivation of information concerning the required corrections with regard to direction and actuating angle. After a manual or automated correction of the tilt position of the sample carrier 5, the centroid SP coincides again with the center of the detector plane DE (upper row, on the right).

The lower row shows on the left an image representation of three highlights 8.1 to 8.*n* situated in the first operating position I, which are situated at a distance Z, and thus closer to the detection optical unit 4. This circumstance is evident from the fact that the distances between the imaged highlights 8.1 to 8.*n* are greater than in the second operating position II. As in the upper row, the centroid SP is displaced according to the tilt angle α and the direction of the tilt from the reference point in the center of the detector plane DE. Centroid SP and reference point coincide again after a corresponding correction (lower row, on the right).

In further embodiments of the distance measuring device 2 according to the invention, a plurality of illumination sources 7 can be fed by one light source 6 (FIG. 5). The light source 6 is formed for example by an LED that emits the measurement radiation MS divergently at an emission angle γ. While the measurement radiation MS in an angular portion passes directly to the sample carrier 5, the measurement radiation MS of a further angular portion impinges on a mirror 7, the effect of which is that said radiation reaches the sample carrier 5. Therefore, the light source 6 simultaneously functions as an illumination source 7 for the directly impinging angular portion, while a virtual illumination source 7 is formed by the mirror 7 and the reflected portion of the measurement radiation MS. The imaged highlights 8.1 and 8.2 are shown by way of example in the right-hand image representation.

In further embodiments of the distance measuring device 2 according to the invention, at least two virtual illumination sources 7 can be fed by one light source 6.

FIG. 6 shows a further embodiment possibility enabling two illumination sources 7 to be provided using one light source 6. Proceeding from the light source 6 having a divergent emission angle γ of approximately 30°, the measurement radiation MS passes to a beam splitter 13, which is embodied here as a 50:50 splitter, for example. Accordingly, half of the measurement radiation MS is reflected along an optical axis of the beam splitter 13 to the sample plane PE, while the other half is transmitted and is directed to the sample plane PE by means of a mirror 10. Both the reflective surface of the beam splitter 13 and the mirror 10 constitute virtual illumination sources 7.

The measurement radiation MS reflected by the beam splitter 13 is directed approximately perpendicularly onto the sample plane PE and a sample carrier 5 situated there. If the sample carrier 5 was previously leveled, i.e. oriented parallel to the sample plane PE, the first highlight 8.1 remains at one location on the sample carrier 5 (here at the midpoint, for example) independently of a distance Z.

With a varying distance Z, the image representation of the second highlight 8.2 shifts and the distance Z can be deduced on the basis of the respective distance between the highlights 8.1 and 8.2.

In a further possible embodiment of the invention, the optical axis oA of the detection optical unit 4 can run at a setting angle β (beta) with respect to the sample plane PE which is not equal to 90° (FIG. 7). An objective 3 of the microscope 1, by means of which the actual microscopic image recording is effected and which can be present in all the exemplary embodiments described here, can nevertheless be directed perpendicularly toward the sample plane PE.

A non-orthogonal arrangement can be provided in order that both the objective 3 and the detection optical unit 4 (represented in a simplified manner by the detector 4.2 and an optical lens 11) can be accommodated on a common stand in a space-saving manner, for example. Moreover, such an embodiment allows the use of a telecentric detection optical unit 4 since a spatial offset of the imaged highlight 8.*n* occurs on account of the known setting angle β for different operating positions, of which a first operating position I and a second operating position II are once again illustrated here. For elucidation purposes, the illustration on the right shows by way of example a position of a highlight 8.I in the first operating position I and of a highlight 8.II in the second operating position II. Virtual positions vPI and vPII of the highlights 8.*n* at the relevant operating positions I and II, respectively, are indicated by way of example and merely schematically.

FIG. 8 makes it clear, however, that a tilt of the sample carrier 5 also leads to a lateral offset of the position of the imaged highlight 8.1 and 8.1*, respectively, on the detector 4.2. Prior knowledge about the presence and the type of a tilt of the sample carrier 5 is therefore necessary in the cases illustrated in FIGS. 7 and 8. It is advantageous if the design of the sample carrier 5 and small tolerances of the placement of the sample carrier 5 on the sample stage 12 ensure that the latter lies in a defined and known orientation with respect to the coordinate system of the microscope 1. Alternatively, leveling of the sample carrier 5 can result in this defined initial state.

REFERENCE SIGNS

1 Microscope
2 Distance measuring device
3 Objective
4 Detection optical unit, overview camera

4.1 Stop
4.2 Detector
4.3 Detector element
5 Sample carrier
6 Light source
7 Illumination source
**8.*n*** Highlight, reflection
9 Controller
10 Mirror
11 Optical lens
12 Sample stage
13 Beam splitter
a Distance (illumination source—stop)
α Tilt angle
β Setting angle
γ Emission angle
DE Detector plane
dv Lateral offset
f Focal length
I First operating state
II Second operating state
MS Measurement radiation
oA Optical axis
PE Sample plane
SP Centroid
vPI First virtual position
vPII Second virtual position
Z Working distance
Δz Difference in distance

The invention claimed is:

1. A distance measuring device in microscopy, comprising:

a sample stage for arranging a sample carrier in a sample plane;

at least one illumination source for providing measurement radiation which is reflected at least proportionally at a surface of the sample carrier;

a detection optical unit for capturing an overview image and also occurring reflections at the sample carrier present in the sample plane;

a detector disposed within the detection optical unit in a detection beam path and serving for a spatially resolved capture of image data of the sample carrier and of the occurring reflections;

an evaluation device for ascertaining at least a distance and/or a tilt of the surface at at least one location of the sample carrier on the basis of the spatially resolved image data and also knowledge of a position of the at least one illumination source relative to the sample plane;

wherein the at least one illumination source emits the measurement radiation toward the sample carrier as divergently emitted measurement radiation over an emission angular range.

2. The distance measuring device according to claim 1, wherein the at least one illumination source comprises a number of illumination sources, at least one of which is arranged away from a virtual connecting line of at least two further illumination sources.

3. The distance measuring device according to claim 1, wherein the detection optical unit is oriented perpendicularly to the sample plane.

4. The distance measuring device according to claim 1, wherein the detection optical unit is embodied in non-telecentric fashion.

5. The distance measuring device according to claim 1, wherein the at least one illumination source comprises a number of illumination sources which are arranged at an identical distance from the detection optical unit.

6. The distance measuring device according to claim 1, wherein the at least one illumination source is switchable in an individually controlled manner.

7. The distance measuring device according to claim 1, wherein a plurality of illumination sources are supplied with the measurement radiation by a common light source by virtue of a beam splitter present in a beam path of the common light source, wherein the effect of the beam splitter is that the measurement radiation is split among a plurality of partial beam paths and the partial beam paths lead to different illumination sources.

8. The distance measuring device according to claim 1, wherein a mirror is arranged in an emission region of the at least one illumination source, wherein the effect of the mirror is that a portion of the emitted measurement radiation is directed onto the sample carrier and a virtual illumination source is formed.

9. A method for ascertaining a spatial orientation of a sample carrier, the method comprising:

illuminating the sample carrier arranged in a sample plane with measurement radiation from at least one illumination source, the measurement radiation being emitted toward the sample carrier as divergently emitted measurement radiation over an emission angular range;

capturing, by a detection optical unit, highlights of the divergently emitted measurement radiation that occur at a surface of the sample carrier in an overview recording, and detecting, by a detector disposed within the detection optical unit in a detection beam path, image data in a spatially resolved manner; and ascertaining, by an evaluation device, at least a distance and/or a tilt of the surface at at least one location of the sample carrier on the basis of the spatially resolved image data and also knowledge of a position of the at least one illumination source relative to the detection optical unit.

10. The method according to claim 9, wherein a distance is ascertained at least at two locations of the sample carrier and a surface shape and/or an orientation of the sample carrier are/is ascertained from the values obtained.

11. The method according to claim 9, wherein the sample carrier is illuminated with measurement radiation from at least three illumination sources which form corner points of a virtual triangle, and a distance of the sample carrier is ascertained from an ascertained spacing of positions of captured highlights of the at least three illumination sources and a tilt of the sample carrier relative to the sample plane is ascertained on the basis of a spacing of the positions of the captured highlights with respect to a predetermined reference point.

12. The method according to claim 9, wherein a distance of the sample carrier and a tilt of the sample carrier relative to the sample plane are ascertained at a plurality of locations, and a map of the sample carrier is created.

13. The method according to claim 9, wherein in the case where a tilt is present, the position of the sample carrier is changed in order to compensate for the tilt.

14. The distance measuring device according to claim 1, wherein the at least one illumination source comprises at least two illumination sources.

15. The method according to claim 9, wherein the at least one illumination source comprises at least two illumination sources.

* * * * *